(12) United States Patent
Larson

(10) Patent No.: US 10,508,682 B2
(45) Date of Patent: Dec. 17, 2019

(54) COMPOSITE TORQUE TUBE END FITTING ATTACHMENT METHOD

(71) Applicant: Moog Inc., East Aurora, NY (US)

(72) Inventor: Lowell Van Lund Larson, Huntington Beach, CA (US)

(73) Assignee: Moog Inc., East Aurora, NY (US)

( * ) Notice: Subject to any disclaimer, the term of this patent is extended or adjusted under 35 U.S.C. 154(b) by 892 days.

(21) Appl. No.: 14/985,493

(22) Filed: Dec. 31, 2015

(65) Prior Publication Data

US 2017/0191520 A1 Jul. 6, 2017

(51) Int. Cl.
| | | |
|---|---|---|
| *F16C 3/02* | (2006.01) | |
| *B29C 53/56* | (2006.01) | |
| *F16D 1/033* | (2006.01) | |
| *B29K 63/00* | (2006.01) | |

(52) U.S. Cl.
CPC ............ *F16C 3/026* (2013.01); *B29C 53/566* (2013.01); *F16D 1/033* (2013.01); *B29K 2063/00* (2013.01)

(58) Field of Classification Search
CPC ........ F16C 3/026; B29C 70/86; B29C 70/865
USPC .................................................. 464/181–183
See application file for complete search history.

(56) References Cited

U.S. PATENT DOCUMENTS

| | | | | |
|---|---|---|---|---|
| 1,755,387 A | * | 4/1930 | Christophersen | F16C 3/02 156/214 |
| 3,537,484 A | * | 11/1970 | McLarty | F16L 9/133 138/109 |
| 3,756,646 A | * | 9/1973 | Gimlett | B29C 70/04 295/15 |
| 4,050,827 A | * | 9/1977 | Jonda | B64C 11/26 24/122.6 |
| 4,185,472 A | | 1/1980 | Yates | |
| 4,187,135 A | | 2/1980 | Yates | |
| 4,236,386 A | * | 12/1980 | Yates | B29C 70/86 138/109 |
| 4,238,539 A | * | 12/1980 | Yates | B29C 70/32 156/172 |
| 4,238,540 A | | 12/1980 | Yates | |
| 4,259,382 A | * | 3/1981 | Schwan | B29C 70/86 156/172 |

(Continued)

FOREIGN PATENT DOCUMENTS

| | | |
|---|---|---|
| GB | 2013556 A | 8/1979 |
| GB | 2051304 A | 1/1981 |

*Primary Examiner* — Matthieu F Setliff
(74) *Attorney, Agent, or Firm* — Hodgson Russ LLP

(57) ABSTRACT

A low-cost method of manufacturing a composite tube assembly having a composite fiber tube connected to metallic end fittings includes placing at least one end fitting on a mandrel, the end fitting including a grip region having a plurality of external surfaces, wrapping a fiber tow around the grip region of each end fitting and the mandrel to form a fiber-wrapped assembly, curing the fiber tow, and removing the mandrel to yield a completed tube assembly. The method may include positioning a plurality of compression inserts around the grip region after some of the fiber tow has been wrapped around the grip region, and wrapping additional fiber tow around the compression inserts and the grip region. The compression inserts may have a rounded outer surface such that an end portion of the tube wound around the compression inserts has a round outer cross-sectional shape.

9 Claims, 4 Drawing Sheets

(56) References Cited

U.S. PATENT DOCUMENTS

| | | | | |
|---|---|---|---|---|
| 4,265,951 A | * | 5/1981 | Yates | B29D 99/0046 |
| | | | | 156/172 |
| 4,275,122 A | * | 6/1981 | Fisher | B29C 66/534 |
| | | | | 285/423 |
| 4,380,443 A | * | 4/1983 | Federmann | F16C 3/026 |
| | | | | 138/109 |
| 4,421,497 A | * | 12/1983 | Federmann | B29C 70/86 |
| | | | | 138/109 |
| 4,561,799 A | * | 12/1985 | Arena | B21D 26/14 |
| | | | | 285/382.2 |
| 4,647,078 A | * | 3/1987 | Lundy | E21B 17/042 |
| | | | | 285/115 |
| 4,704,918 A | * | 11/1987 | Orkin | D04C 3/48 |
| | | | | 403/224 |
| 4,706,364 A | * | 11/1987 | Aubry | B29C 65/00 |
| | | | | 138/109 |
| 4,932,924 A | * | 6/1990 | Lobel | F16C 3/026 |
| | | | | 464/181 |
| 4,974,245 A | * | 11/1990 | Mioque | F16L 47/24 |
| | | | | 250/356.1 |
| 4,988,128 A | * | 1/1991 | Do | B29C 70/86 |
| | | | | 285/222.1 |
| 5,154,109 A | * | 10/1992 | Fluga | F15B 15/1447 |
| | | | | 29/888.046 |
| 5,160,392 A | * | 11/1992 | Thongs, Jr. | B29C 53/585 |
| | | | | 156/172 |
| 5,322,580 A | * | 6/1994 | McIntire | B29C 37/0078 |
| | | | | 156/148 |
| 5,342,464 A | * | 8/1994 | McIntire | B29C 37/0078 |
| | | | | 156/172 |
| 5,553,964 A | * | 9/1996 | Rouillot | F16C 3/026 |
| | | | | 285/256 |
| 6,072,252 A | * | 6/2000 | Van Dine | F16C 3/026 |
| | | | | 310/43 |
| 6,234,912 B1 | * | 5/2001 | Koschier | F16C 3/026 |
| | | | | 464/179 |
| 6,464,591 B1 | | 10/2002 | Nakajima | |
| 6,561,912 B1 | * | 5/2003 | Link | F16C 3/026 |
| | | | | 403/345 |
| 6,676,169 B1 | | 1/2004 | Reynolds | |
| 7,335,108 B2 | | 2/2008 | Lin et al. | |
| 7,419,435 B2 | | 9/2008 | Borges et al. | |
| 7,452,156 B2 | * | 11/2008 | Kennedy | B29C 53/562 |
| | | | | 403/293 |
| 7,682,256 B2 | | 3/2010 | Brace et al. | |
| 7,874,925 B2 | | 1/2011 | Dewhirst | |
| 8,025,580 B2 | | 9/2011 | Genot et al. | |
| 8,157,469 B2 | * | 4/2012 | Kennedy | F16C 7/026 |
| | | | | 403/293 |
| 8,262,825 B2 | * | 9/2012 | Fahey | B29C 53/585 |
| | | | | 156/172 |
| 8,414,724 B2 | * | 4/2013 | Schnelz | B29C 66/1162 |
| | | | | 156/172 |
| 8,419,887 B2 | * | 4/2013 | Kennedy | F16C 7/026 |
| | | | | 156/294 |
| 2005/0239562 A1 | * | 10/2005 | Lin | B29C 70/462 |
| | | | | 464/181 |
| 2007/0213136 A1 | * | 9/2007 | Borges | F16C 3/023 |
| | | | | 464/179 |
| 2008/0118303 A1 | * | 5/2008 | Kennedy | F16C 7/026 |
| | | | | 403/292 |
| 2008/0119296 A1 | * | 5/2008 | Kennedy | B29C 53/562 |
| | | | | 464/181 |
| 2011/0186211 A1 | * | 8/2011 | Fahey | B29C 53/585 |
| | | | | 156/227 |
| 2011/0192528 A1 | * | 8/2011 | Kozaki | B29C 53/585 |
| | | | | 156/173 |
| 2012/0199271 A1 | * | 8/2012 | Kennedy | F16C 7/026 |
| | | | | 156/91 |
| 2014/0141894 A1 | | 5/2014 | Freund et al. | |
| 2016/0230805 A1 | * | 8/2016 | Busch | B29C 70/52 |

\* cited by examiner

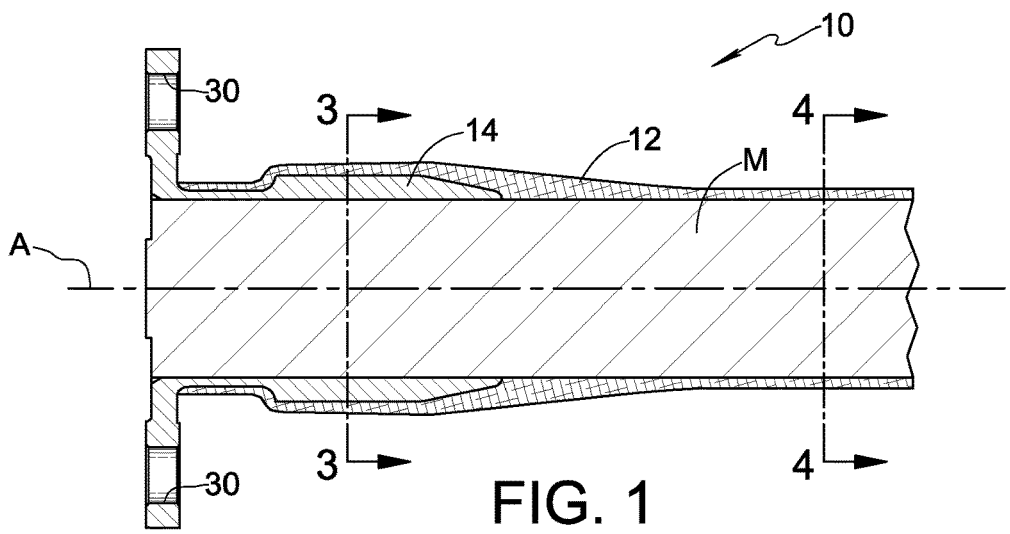
FIG. 1
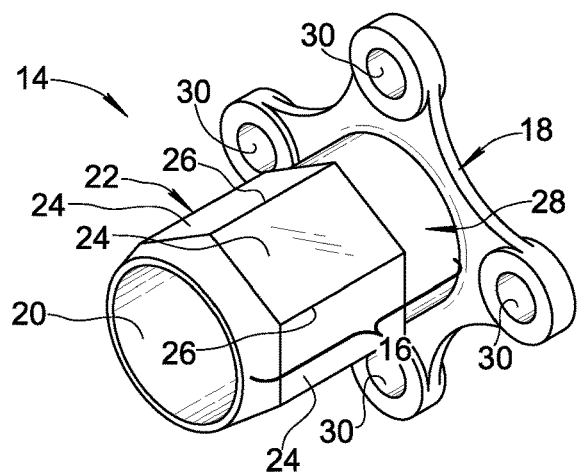
FIG. 2
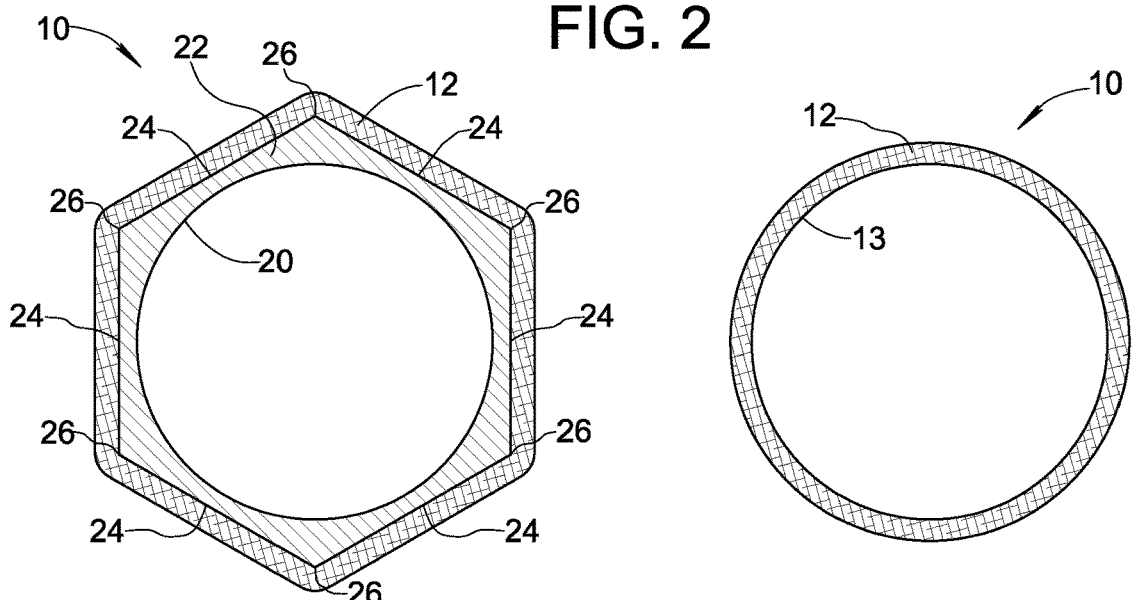
FIG. 3
FIG. 4

COMPOSITE TORQUE TUBE END FITTING ATTACHMENT METHOD

FIELD OF THE INVENTION

The present invention relates generally to torque tubes (sometimes referred to as torque shafts) used on an aircraft utility or flight control drive line, or on any drive line that requires a torque tube for transmitting torque.

BACKGROUND OF THE INVENTION

A torque tube transmits static and dynamic torsional loads in power transmission applications. For example, torque tubes are commonly used in aircraft to provide power transmission for actuating and braking flight control surfaces, e.g. flaps and slats, and for actuating aircraft door latches. Each end of a torque tube may be provided with an end fitting configured for mechanically coupling the torque tube to another transmission mechanism in the drive line.

So-called "composite" torque tubes made by winding carbon fiber tow around a mandrel are widely used in the aircraft industry in part because they are lighter than metal torque tubes yet still meet critical strength requirements. Composite torque tubes also offer improved flexural rigidity and torsional rigidity.

A recognized challenge in manufacturing composite torque tubes involves the attachment of the metallic end fittings to the composite material tube portion. It is important to attach the metallic end fittings to the composite tube such that the junction between the composite material and each end fitting is reliable and not prone to failure under loading.

Various schemes for attaching end fittings to a composite torque tube have been proposed. U.S. Pat. No. 7,335,108 (Lin e al.) describes a drive shaft assembly having a composite tube and a pair of end fitting captured at each end of the composite tube. The assembly may be made by winding pre-impregnated ("prepreg") fiber tow over a mandrel and the end fittings, enclosing the components in a vacuum bag and evacuating the internal space of vacuum bag, curing the prepreg fiber tow, and removing the vacuum bag and mandrel. Each end fitting includes a neck leading to a region having radially projecting lugs angularly spaced about a central axis of the assembly. The region having radially projecting lugs is captured by the composite material to transmit axial and torsional loads between the composite tube and the end fitting. The composite material has a non-circular cross-sectional profile where it surrounds the lug region of the end fitting.

U.S. Pat. No. 7,419,435 (Borges et al.) discloses a composite torque tube assembly formed by mounting a metallic end fitting on a mandrel and wrapping a portion of the end fitting and the mandrel in composite material which is then cured. The end fitting is characterized by one or more pairs of diametrically opposite lobes extending radially outward from a central axis of the end fitting to improve torque transmission between the composite material and the end fitting. The end fitting includes a cylindrical axial passage aligned with a cylindrical axial passage of the tube formed of composite material, wherein the diameter of the tube passage is greater than the diameter of the end fitting passage. Thus, the forming mandrel must have a radial step transitioning from the main diameter of the composite tube to the smaller diameter of the end fitting. Consequently, the mandrel cannot be axially withdrawn from the assembly after curing, and instead must be dissolved by flushing a dissolving liquid through the passage of the end fitting. This process is expensive and harmful to the end fitting and the composite material.

U.S. Pat. No. 7,682,256 (Brace et al.) teaches a composite torque tube assembly wherein a metallic end fitting is provided with an external coupling region having a plurality of radially-protruding lugs spaced apart from one another to define channels in between rows of lugs. The channels are arranged to extend at an intended fiber wrap angle to directly receive the wound composite material to enhance torque transmission between the composite material and the end fitting. The lugs have abrupt transitions and/or sharp edges that may degrade the composite material where it interfaces with the end fitting. Moreover, torque transmission is distributed very unevenly among the lugs, with a leading lug in each row receiving most of the transmitted force. As a result, the torque tube assembly is prone to having a reduced service life.

U.S. Pat. No. 7,874,925 (Dewhirst) describes a method of making a torque tube assembly by pressing an internally-splined end fitting onto an end region of a cured composite tube. The end region of the composite tube must be precision-machined to a predetermined diameter to provide a slight interference fit with the internally splined end fitting. An adhesive is introduced when the end fitting is pressed on to the composite tube to improve bonding. The process is expensive and requires significant operator skill to yield an acceptable end product.

U.S. Pat. No. 8,025,580 (Genot et al.) discloses a composite torque tube assembly having a metal fitting arranged fixedly around a portion of a composite tube. The metal fitting has a non-circular inner surface profile mating with a complementary outer surface profile of the composite tube in the region of the metal fitting. The portion of the composite tube surrounded by the metal fitting is manufactured directly inside the metal fitting by providing a fibrous preform inside the fitting and injecting a plastic, such as epoxy resin, into the fibrous preform to form a matrix. The manufacturing method does not involve winding uncured prepreg fiber tow over a mandrel.

What is needed is a composite torque tube assembly that is more economical to manufacture than known composite torque tube assemblies, yet meets specified performance requirements.

SUMMARY OF THE INVENTION

The present invention provides a lower cost method of manufacturing a composite tube assembly having a composite fiber tube connected to metallic end fittings, wherein the resulting tube assembly still meets performance specifications.

In a first embodiment of the invention, the method generally comprises placing at least one end fitting on a mandrel, the end fitting including an axially elongated stem, a transmission coupling at a distal end of the stem, and a passage through the transmission coupling and the stem for receiving an end portion of the mandrel, wherein the stem includes a grip region having a plurality of external surfaces. The method further comprises wrapping a fiber tow around the grip region of each end fitting and around the mandrel to form a fiber-wrapped assembly, curing the fiber tow, and removing the mandrel to yield a completed tube assembly.

In a second embodiment of the invention, the method summarized above further comprises positioning a plurality of compression inserts around the grip region of each end fitting after some of the fiber tow has been wrapped around the grip region, and wrapping additional fiber tow around the compression inserts and the grip region. The compression inserts may have a rounded outer surface such that an end portion of the tube wound around the compression inserts has a round outer cross-sectional shape.

The invention also encompasses composite tube assemblies manufactured by the inventive method embodiments.

BRIEF DESCRIPTION OF THE DRAWINGS

The nature and mode of operation of the present invention will now be more fully described in the following detailed description of the invention taken with the accompanying drawing figures, in which:

FIG. 1 is a longitudinal cross-sectional view showing one end portion of a composite torque tube assembly formed in accordance with a first embodiment of the present invention, wherein the torque tube assembly is shown on a forming mandrel;

FIG. 2 is a perspective view showing an end fitting of the composite torque tube assembly shown in FIG. 1;

FIG. 3 is a transverse cross-sectional view taken generally along the line 3-3 in FIG. 1;

FIG. 4 is another transverse cross-sectional view taken generally along the line 4-4 in FIG. 1;

DETAILED DESCRIPTION OF THE INVENTION

Figure 5:
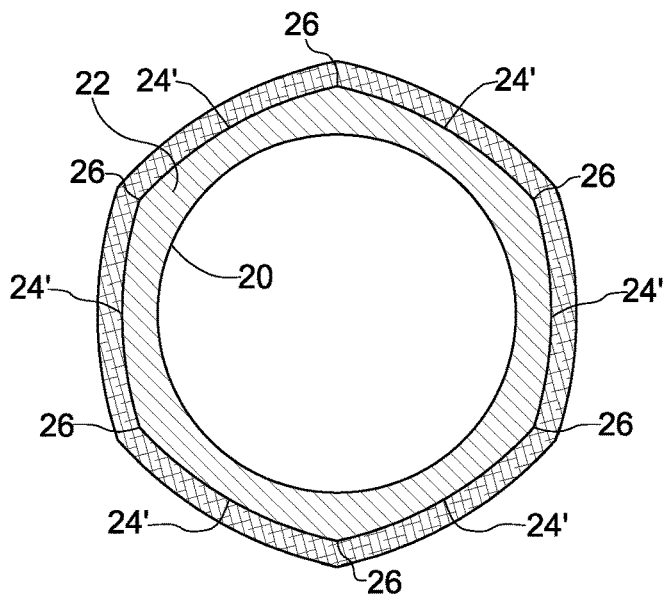
FIG. 5 is a view similar to that of FIG. 3, illustrating an alternative configuration of a grip portion of the end fitting having convex external surfaces.

FIG. 1 illustrates an end portion of a composite torque tube assembly 10 formed in accordance with a first embodiment of the present invention. Composite torque tube assembly 10 generally comprises a tube 12 formed of a wound fiber-reinforced composite material, and at least one metallic end fitting 14 held by the wound composite material. As will be understood by those skilled in the art of torque tubes, another end fitting (not shown) may be provided at an opposite end of composite torque tube assembly 10. In the view of FIG. 1, a forming mandrel M and a longitudinal axis A of torque tube assembly 10 are also shown.

Additional reference is made to FIGS. 2 and 3. End fitting 14 includes an axially elongated stem 16, a transmission coupling 18 at a distal end of stem 16, and an internal passage 20 extending axially through stem 16 and transmission coupling 18. Stem 16 includes a grip region 22 having a polygonal outer cross-sectional shape defining a plurality of flat external surfaces 24 each bounded by a pair of corner edges 26. An end portion of composite tube 12 is wound around grip region 22 of stem 16. As will be understood, transmission coupling 18 may take a form dictated by the configuration of a mating element in the applicable drive system. For example, coupling 18 may be a flange with a bolt hole array, a universal joint trunnion, an internal or external spline, or some other coupling element.

In the drawing figures, the outer cross-sectional shape of grip region 22 is depicted, for example, as a regular hexagon. However alternative polygonal shapes may be used. The polygonal shape of grip region 22 may be an irregular polygon, and/or a polygon other than a hexagon.

Stem 16 may also include a neck region 28 between grip region 22 and transmission coupling 18. Neck region 28 may have a circular outer cross-sectional shape. As shown in FIG. 1, the end portion of tube 12 may be wound around both the grip region 22 and the neck region 28 of stem 16, and the end portion of tube 12 may abut with transmission coupling 18.

As shown in FIGS. 1 and 4, tube 12 transitions into a cylindrical tube of composite material as it extends axially away from end fitting 14. As may be understood, in the region shown in FIG. 4, tube 12 may have an inner diameter 13 determined by the outer diameter of mandrel M.

External surfaces 24 of grip region 22 may be other than flat surfaces. For example, in a variation of the first embodiment illustrated in FIG. 5, external surfaces of grip region 22 may be convex curved surfaces 24'. Such a variation may be used to reduce stress on the composite fiber winding at corner edges 26 as compared to a grip region having flat external surfaces 24.

Figure 6:
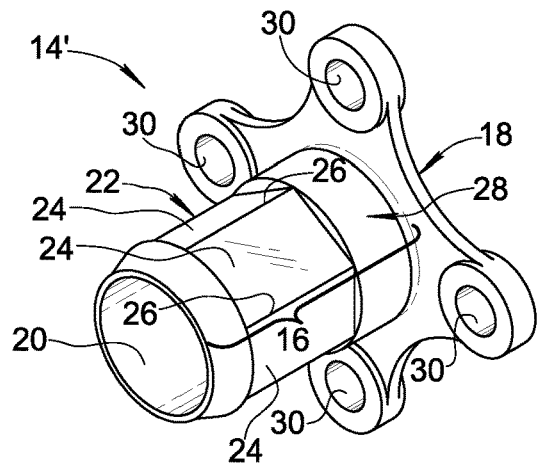
FIG. 6 is a perspective view illustrating an alternative configuration of the end fitting wherein external surfaces of a grip portion of the end fitting are recessed relative to a neck region of the end fitting.
Figure 7:
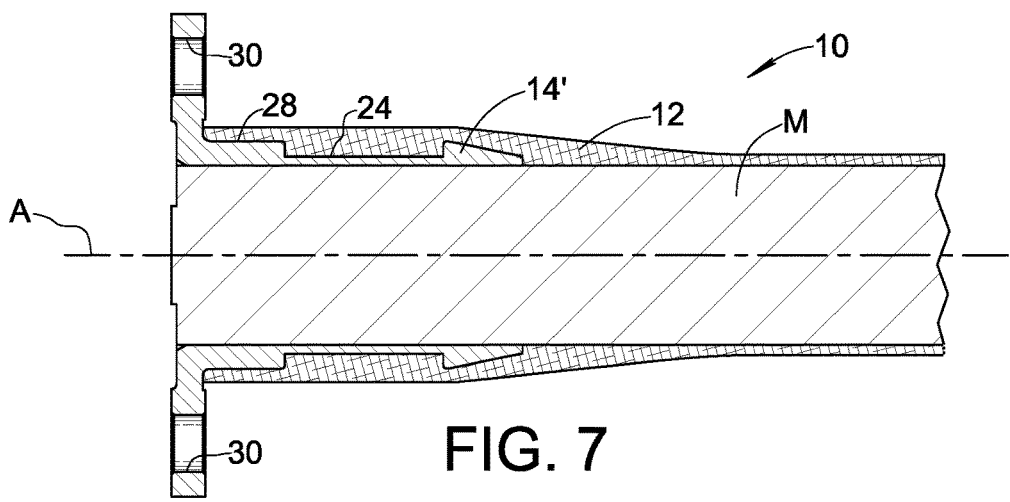
FIG. 7 is a longitudinal cross-sectional view illustrating a composite torque tube assembly formed in accordance with the first embodiment of the invention and incorporating the alternative end fitting shown in FIG. 6.

In FIGS. 1 and 2, it can be seen that the neck region 28 of end fitting 14 is recessed relative to the external surfaces 24 of the end fitting. Accordingly, the diameter of neck region 28 is less than a transverse dimension of grip region measured from one of the corner edges 26 through axis A to an opposite corner edge 26 or surface 24 of the grip region, as the case may be. However, as depicted in FIGS. 6 and 7, a modified end fitting 14' may be used wherein the external surfaces 24 are recessed relative to neck region 28. In this modification, stem 16 may be formed by milling external surfaces 24 into an outer surface of an elongated cylindrical portion of end fitting 14' that extends from transmission coupling 18.

Figure 12:
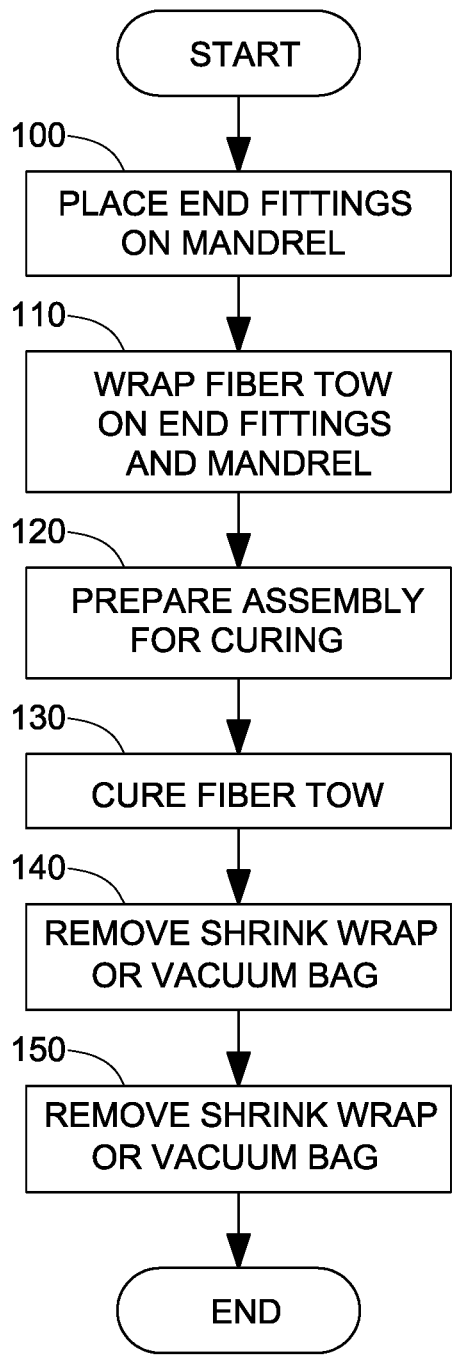
FIG. 12 is a flow diagram illustrating a method of making a composite torque tube assembly of the first embodiment.

A method of manufacturing torque tube assembly 10 of the first embodiment will now be described with reference to FIG. 12. The first step 100 is to place a pair of end fittings 14 on opposite ends of cylindrical mandrel M. Mandrel M may be a mold release mandrel that is prepared with a release agent to allow the fiber-reinforced composite material of tube 12 to be separated from the mandrel after a later curing step (described below). The internal passage 20 of each end fitting 14 may be sized for sliding fit with the outer surface of mandrel M as shown in FIGS. 1 and 7. A fiber filler mixture, such as flocked cotton fiber, milled fiber, or chopped fiber mixed with resin, may be applied to end fitting 14 to smooth the fiber transition from mandrel M to end fitting 14.

Once the end fittings 14 are in place at opposite ends of mandrel M, the next step 110 is wrapping fiber tow around the stem 16 of each end fitting 14 and around mandrel M to form a fiber-wrapped assembly. The fiber tow may be a "prepreg" fiber tow, which is a thermosetting resin matrix pre-impregnated with fibers and partially cured to a B stage of curing to provide a composite fiber tow material that is thickened and somewhat tacky in comparison to uncured "wet" layup material. The fibers may include, for example, carbon fibers, glass fibers, aramid fibers, boron fibers, and/or ceramic fibers. The thermosetting resin cures fully at an elevated temperature by undergoing an irreversible chemical reaction in which cross-linking of the resin molecules converts the resin to a stable solid (the C stage), whereby curing transforms the wrapped fiber tow into a solid structural composite material.

Wrapping of the fiber tow may be performed using a conventional machine tool operated to rotate mandrel M and end fittings 14 about their common longitudinal axis A in the manner of a lathe while a fiber tow feeder is reciprocated back and forth in the axial direction to feed fiber tow to the rotating assembly to achieve a predetermined winding pattern as the fiber tow is taken up by the rotating assembly. When the fiber tow wrapping step 110 is completed, a fiber-wrapped assembly is formed that includes the mandrel M, the end fittings 14, and the wrapped fiber tow material. If prepreg fiber tow is used, the wrapped fiber tow material is in a partially cured (B stage) condition.

The next step 120 is preparing the fiber wrapped assembly so that the fiber tow material may be cured in an oven or autoclave. Preparing step 120 may include shrink-wrapping the fiber-wrapped assembly with a shrink-wrap tape. Alternatively, the assembly may be vacuum bagged to remove volatiles and trapped air.

Once the fiber-wrapped assembly is prepared as described above, the fiber tow material is cured at elevated temperature by placing the assembly in an oven or an autoclave, as is known in the art of composites. The curing protocol will depend upon the size and configuration of torque tube assembly 10 and the type of fiber tow being used. The curing step is indicated at block 130 in FIG. 12.

After the fiber tow material is fully cured, the assembly is removed from the oven or autoclave, and the shrink wrapping or vacuum bag is removed in step 140.

Finally, mandrel M is withdrawn in step 150 by sliding it axially out of the assembly. The remaining structure comprises torque tube assembly 10 in finished form.

Figure 8:
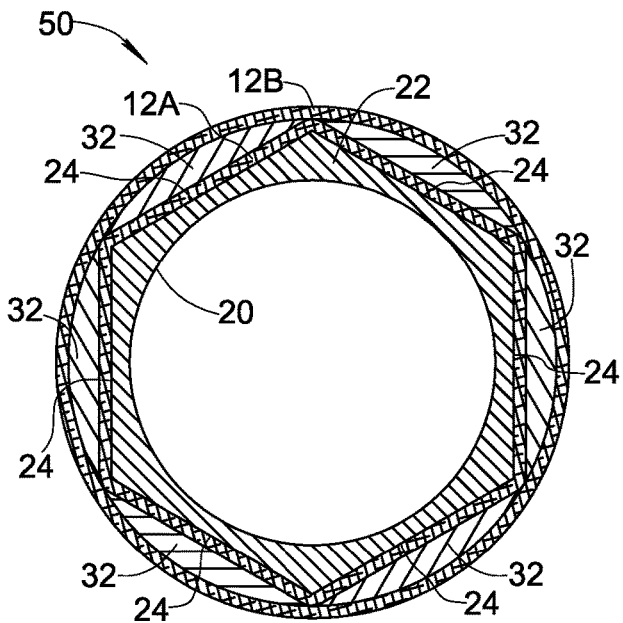
FIG. 8 is a view similar to that of FIG. 3, however showing a composite torque tube assembly formed in accordance with a second embodiment of the present invention characterized by compression inserts.

FIG. 8 is a cross-sectional view of a composite torque tube assembly 50 formed in accordance with a second embodiment of the present invention. Torque tube assembly 50 is the same as torque tube assembly 10 of the first embodiment, except that assembly 50 further includes a plurality of compression inserts 32 respectively associated with each of the plurality of external flats 24, wherein the end portion of tube 12 is wound around the compression inserts 32. Compression inserts 32 may be seated between a radially inner winding 12A of the fiber-reinforced composite material and a radially outer winding 12B of the fiber-reinforced composite material.

Figure 9:
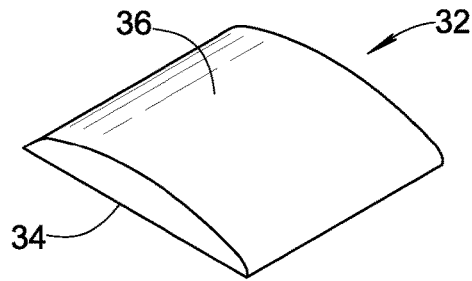
FIG. 9 is a perspective view showing a compression insert of the composite torque tube assembly shown in FIG. 8.

As best seen in FIG. 9, compression inserts 32 may have a circular segment shape that includes a planar base 34 arranged to face toward a respective external flat 24 and a rounded surface 36 opposite planar base 34, whereby the end portion of the composite tube constituting outer winding 12B has a round (i.e. circular or oval) outer cross-sectional shape that avoids sharp edges. Compression inserts 32 may be formed of any material suitable to withstand compression loading, such as stainless steel, ceramic, or plastic. A primer coating may be applied to compression inserts 32 so that they will better adhere to the epoxy resin used in the fiber-reinforced composite material. Compression inserts 32 help the composite fiber material to grip metallic end fitting 14, thereby improving torque transfer between the composite tube 12 and end fitting 14.

Figure 10:
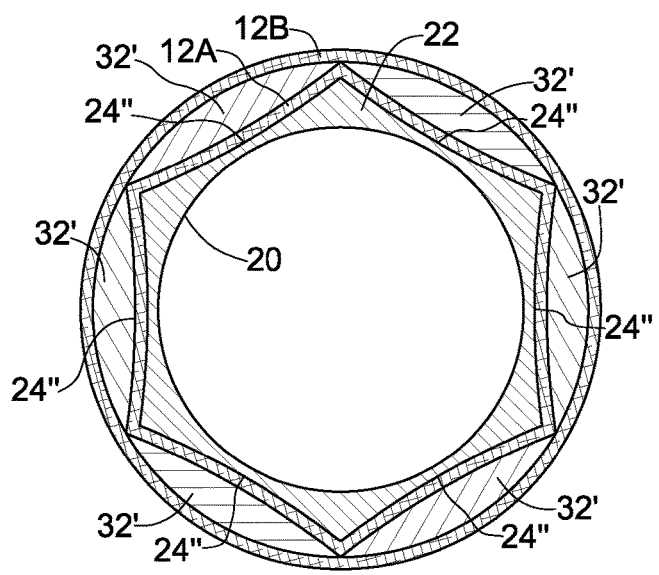
FIG. 10 is a view similar to that of FIG. 8, illustrating an alternative configuration of a grip portion of the end fitting having concave external surfaces.
Figure 11:
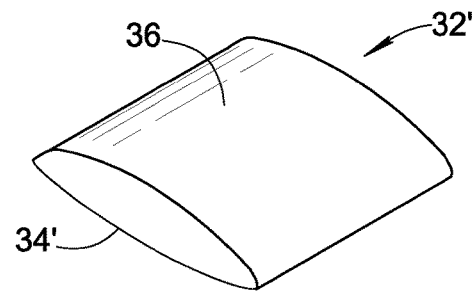
FIG. 11 is a perspective view showing a compression insert of the composite torque tube assembly shown in FIG. 10.

As in the first embodiment described above, external surfaces 24 of grip region 22 may be other than flat surfaces. For example, in a variation of the second embodiment illustrated in FIG. 10, external surfaces of grip region 22 may be concave curved surfaces 24". In this case, a modified compression insert 32' may be used having a convex curved base 34' complementary to concave external surfaces 24". Such a variation may be used to facilitate proper location and seating of the compression inserts.

Figure 13:
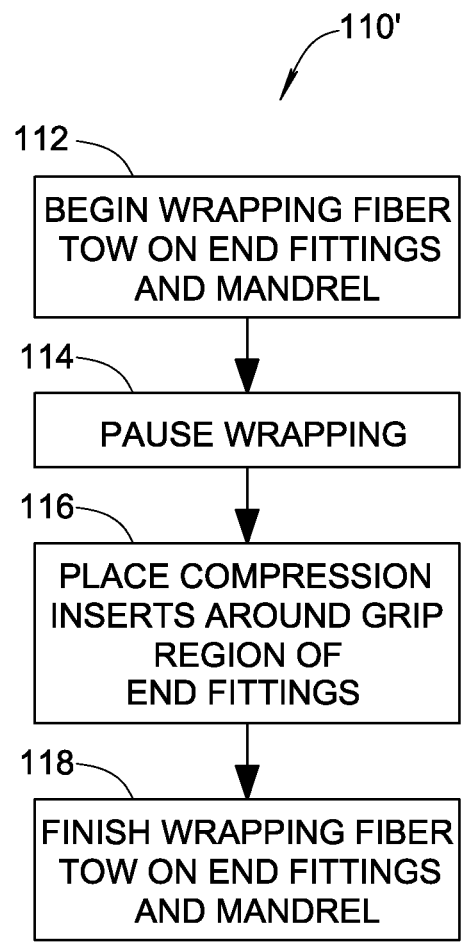
FIG. 13 is a flow diagram illustrating alternative method steps usable to modify the method illustrated in FIG. 10 for making a composite torque tube assembly of the second embodiment.

A method of making torque tube assembly 50 of the second embodiment is the same as that described above for making torque tube assembly 10 of the first embodiment, except that fiber tow wrapping step 110 is replaced by a sequence of steps 110' as shown in FIG. 13 to allow compression inserts 32 to be added. In sequence 110', wrapping of fiber tow around the stem 16 of each end fitting 14 and around mandrel M is begun in step 112 and then paused in step 114. Next, in step 116, compression inserts 32 are placed around the grip region 22 of each end fitting 14. Sequence 110' proceeds to step 118, wherein the wrapping of fiber tow around end fitting stems 16 and mandrel M is finished. The method then follows steps 120 through 150 shown in FIG. 12 and described above to yield a completed torque tube assembly 50 of the second embodiment.

The present invention provides a low cost method of attaching a metallic end fitting onto a composite fiber tube in which a single curing step in an autoclave or oven produces a finished product once the mandrel is removed. A torque tube assembly formed in accordance with the present invention meets all of the specified requirements applicable to current composite torque tubes—including weight, strength, and size envelope requirements—but is less expensive to manufacture than composite torque tubes made according to known methods.

The present invention has utility beyond torque tubes, and is applicable for making compression and tension rod assemblies.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:
1. A composite tube assembly comprising:
   a tube formed of a wound fiber-reinforced composite material;
   a metallic end fitting including a stem and a transmission coupling at a distal end of the stem;
   the stem including a grip region having a plurality of external surfaces;
   a plurality of individual compression inserts;
   wherein each of the plurality of external surfaces is associated with only one of the plurality of compres- sion inserts, and each of the plurality of compression inserts is associated with only one of the plurality of external surfaces;

wherein an end portion of the tube is wound around the grip region of the stem and the compression inserts;

wherein the plurality of external surfaces are flat surfaces; and wherein each of the plurality of compression inserts has a circular segment shape including a planar base facing a respective one of the plurality of flat external surfaces and a rounded surface intersecting with the planar base, and the end portion of the tube wound around the compression inserts has a round outer cross-sectional shape.

2. The composite tube assembly according to claim 1, wherein the compression inserts are located between a radially inner winding of the fiber-reinforced composite material and a radially outer winding of the fiber-reinforced composite material.

3. The composite tube assembly according to claim 1, wherein the plurality of external surfaces are flat surfaces.

4. The composite tube assembly according to claim 3, wherein the compression inserts have a circular segment shape including a planar base facing a respective one of the plurality of flat external surfaces and a rounded surface extending from the planar base, and the end portion of the tube wound around the compression inserts has a round outer cross-sectional shape.

5. The composite tube assembly according to claim 1, wherein the stem further includes a neck region between the grip region and the transmission coupling, wherein the neck region has a circular outer cross-sectional shape.

6. The composite tube assembly according to claim 5, wherein the neck region is recessed relative to the plurality of external surfaces.

7. The composite tube assembly according to claim 5, wherein the plurality of external surfaces are recessed relative to the neck region.

8. The composite tube assembly according to claim 5, wherein the end portion of the tube is wound around the grip region and the neck region of the stem.

9. The composite tube assembly according to claim 8, wherein the end portion of the tube abuts with the transmission coupling.

* * * * *